United States Patent [19]

Helenius et al.

[11] Patent Number: 5,428,822
[45] Date of Patent: Jun. 27, 1995

[54] RADIO SYSTEM INCLUDING MOBILE RADIO STATIONS WHICH PROVIDE REGISTRATION MESSAGE WITH INFORMATION INDICATING THE ORDER OF TRANSMISSION OF THE MESSAGES

[75] Inventors: Ali Helenius, Nokia; Pirkko Laaksonen, Tampere; Markku Lehtonen, Ylöjärvi, all of Finland

[73] Assignee: Nokia Telecommunications OY, Espoo, Finland

[21] Appl. No.: 137,127

[22] PCT Filed: Mar. 5, 1993

[86] PCT No.: PCT/FI93/00078
§ 371 Date: Oct. 20, 1993
§ 102(e) Date: Oct. 20, 1993

[87] PCT Pub. No.: WO93/18622
PCT Pub. Date: Sep. 16, 1993

[30] Foreign Application Priority Data

Mar. 6, 1992 [FI] Finland .................................. 920995

[51] Int. Cl.⁶ .............................................. H04B 7/26
[52] U.S. Cl. .................................. 455/54.1; 455/56.1; 379/59
[58] Field of Search ................ 455/33.1, 33.2, 33.4, 455/34.1, 53.1, 54.1, 54.2, 56.1; 379/59, 60

[56] References Cited

U.S. PATENT DOCUMENTS

| | | | |
|---|---|---|---|
| 5,247,698 | 9/1993 | Sawyer | 455/33.1 |
| 5,257,399 | 10/1993 | Kallin et al. | 455/33.1 |
| 5,276,911 | 1/1994 | Levine et al. | 455/53.1 |

FOREIGN PATENT DOCUMENTS

| | | | |
|---|---|---|---|
| 0415898 | 3/1991 | European Pat. Off. | H04B 7/26 |
| 0475698 | 3/1992 | European Pat. Off. | H04Q 7/04 |

Primary Examiner—Reinhard J. Eisenzopf
Assistant Examiner—Chi H. Pham
Attorney, Agent, or Firm—Cushman Darby & Cushman

[57] ABSTRACT

A radio system including at least one local exchange (MX); a radio network having fixed radio stations (BS) located apart from each other and connected to the local exchange; and at least one mobile radio station (MS) capable of roaming freely within the area of the radio network and informing the radio network of its location by selecting one of the fixed radio stations (BS) in accordance with a predetermined selection procedure and sending to the base station a registration message which is forwarded to the local exchange (MX). The mobile radio station (MS) provides the registration messages with information indicating the order of transmission of the messages, on the basis of which information the radio network determines the order of transmission of successive registration messages of the same mobile radio station.

10 Claims, 1 Drawing Sheet

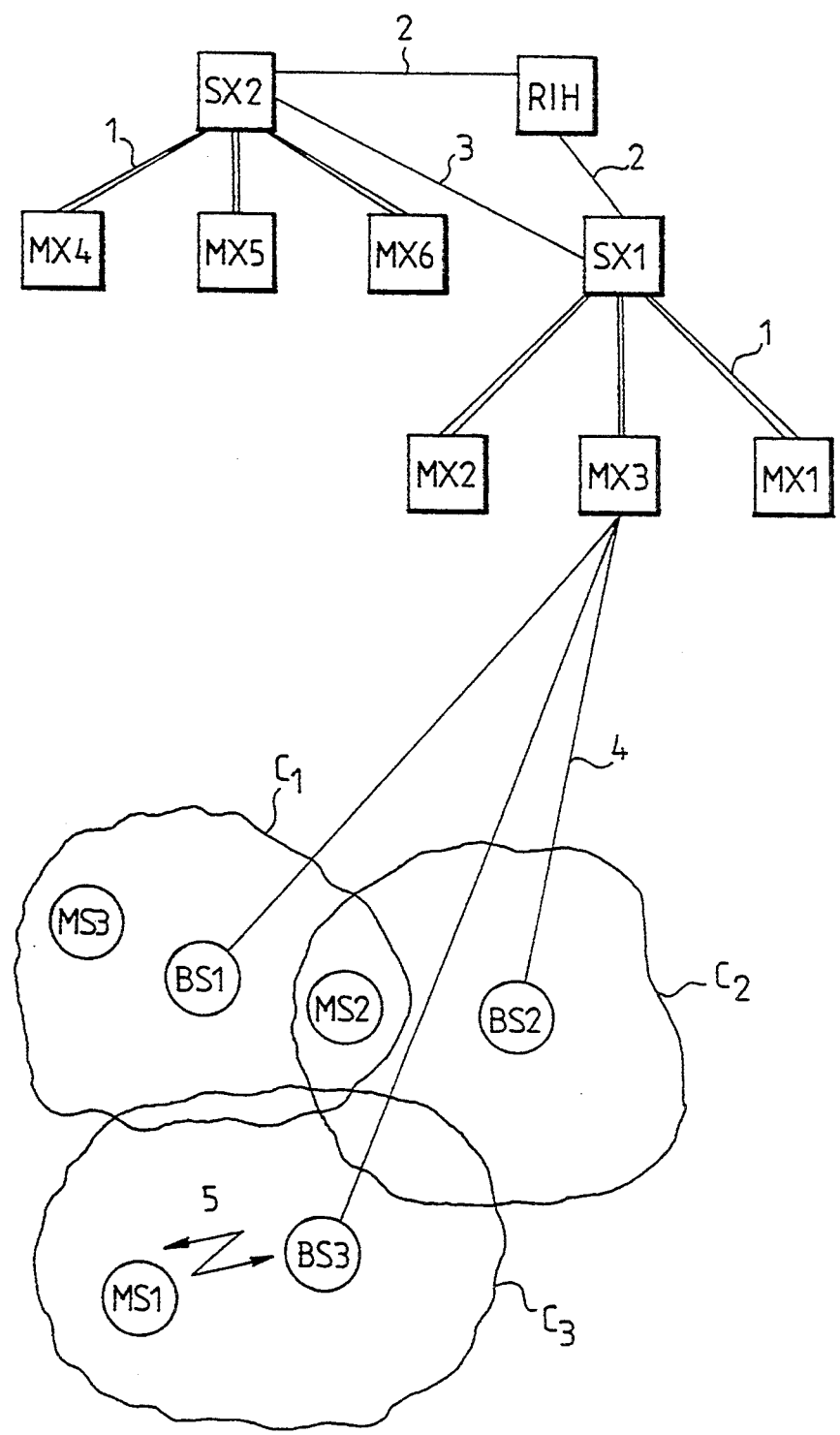

RADIO SYSTEM INCLUDING MOBILE RADIO STATIONS WHICH PROVIDE REGISTRATION MESSAGE WITH INFORMATION INDICATING THE ORDER OF TRANSMISSION OF THE MESSAGES

FIELD OF THE INVENTION

The invention relates to a radio system comprising at least one local exchange; a radio network comprising fixed radio stations located apart from each other and connected to the local exchange; and at least one mobile radio station capable of roaming freely within the area of the radio network and informing the radio network of its location by selecting one of the fixed radio stations in accordance with a predetermined selection procedure and sending to the base station a registration message which is forwarded to the local exchange.

BACKGROUND OF THE INVENTION

In mobile radio systems where the mobile radios are allowed to roam freely within the area of the system and have access to the system through a base station selected by them, the registrations of the mobile radios are utilized to keep a record of the coarse location of the mobile radios so that the system is capable of routing calls to the mobile radios. Registration can also be used to prevent the access of unauthorized users to the system. The mobile radio performs a registration whenever it changes the registration area by sending a registration message to a base station selected in accordance with a predetermined selection procedure. The registration message is then forwarded to the mobile radio exchange. In some mobile radio systems, such as the NMT (Nordic Mobile Telephone), the mobile radio has to wait for a registration acknowledgement from the mobile radio exchange before it is allowed to attempt to register through another base station. If the mobile radio does not receive a registration acknowledgement, it informs the user about the situation. The problem with unsuccessful registration is thus left to the user. In some other mobile radio systems, such as the Mobile Private Trunking networks complying with the specifications MPT 1327 and MPT 1434 of the British Department of Trade and Industry, attempts have been made to improve the registration procedure from the user's viewpoint so that if a registration to one mobile radio exchange is not successful, the mobile radio has a chance to try to register, very rapidly, to another mobile radio exchange. If the mobile radio attempts to register to several mobile radio exchanges within a short period of time, the mobile radio system may not be able to determine the actual order of the registration messages received by the different mobile radio exchanges, and so the location of the mobile radio is ambiguous. In this kind of system, the failure of the registration or the disordering of successive registrations may result from, e.g., the radio path delays and interferences, the delays and interferences of the internal transmission paths of the central network, and the registration frequency of the mobile radios.

SUMMARY OF THE INVENTION

The object of the present invention is to enable an unambiguous determination of the order of reception of successive registrations in a radio system where a mobile radio is allowed to attempt to register to several mobile radio exchanges.

This is achieved by a radio system of the type described in the introductory part of this specification, which according to the invention is characterized in that the mobile radio station provides the registration messages with information indicating the order of transmission of the messages, on the basis of which information the radio network determines the order of transmission of registration messages sent by the same mobile radio station through the different local exchanges, and that the radio network regards as valid the registration corresponding to the registration message sent last and rejects or cancels the registrations caused by preceding registration messages.

The basic idea of the invention is that the mobile radio station, such as a mobile radio, provides each registration message at the transmission stage with information indicating the order of transmission of the registration messages. Such information may consist of, e.g., a serial number, time or the like. The radio network itself then determines the transmission order of the received registration messages on the basis of the information contained in the registration messages. By means of the invention, the disordering of successive registration messages after the transmission can be completely avoided. Consequently, the incorrect registrations and location determinations of the mobile radio station can also be avoided in the system. The order information can be carried with the registration data on all hierarchical levels of the radio system, such as in the local exchanges, system exchanges, central data-bases, etc., so that it is possible to avoid the disordering of the registration requests of the same mobile radio, received on the higher hierarchical levels of the system over different paths, irrespective of the failures, interferences and delays of the internal transmission paths of the radio system.

BRIEF DESCRIPTION OF THE DRAWINGS

The invention will be described in the following in more detail by means of illustrating embodiments with reference to the attached drawings, in which:

The sole figure shows a schematic block diagram illustrating a radio system according to the invention.

DETAILED DESCRIPTION OF A PREFERRED EMBODIMENT OF THE INVENTION

The figure shows a radio system in which the geographical area covered by the system is divided into smaller radio areas or radio cells C1, C2, C3, so that neighbouring cells preferably overlap. Each cell C1, C2, C3 comprises at least one fixed multi-channel transceiver equipment BS1, BS2 and BS3, herein called a base station. All base stations BS1, BS2 and BS3 are connected by fixed links 4, such as cables, to a mobile radio exchange MX, which thus controls several base stations BS.

Predetermined radio frequencies or radio channels are assigned to the radio system for the speech or data connections. The base stations BS establish a radio link 5 over the radio channels to remote radio stations or mobile radios MS roaming within the cells. In addition, each base station BS comprises at least one radio channel that acts as a control channel over which control signalling, such as registration signalling and call setup signalling, is performed between the mobile radio and the base station. The signalling may be, e.g., mobile radio signalling complying with the standard MPT 1327 specified by the British Department of Trade and Industry.

One or more transceivers or mobile radios MS1, MS2 and MS3 roam freely within the area of the mobile radio system. Each mobile radio MS has to register to one of the base stations BS when it is active within the area of the system. In this way, the system keeps a record of the coarse location of the mobile radios MS for the call setup procedures. The mobile radios MS may roam freely from one cell C to another but when they leave the registration area, they have to register to the base station BS of the new cell C. The mobile radio MS is considered to be active in the cell C when it has selected the cell in accordance with a predetermined procedure, the base station BS of the cell has sent a burst and the mobile radio MS has received the identity code of the base station.

The smallest configuration of the mobile radio network is a local network comprising a single mobile radio exchange MX (local exchange) and a base station system controlled by the exchange. The base station system may comprise 1 to 30 base stations providing services for 500 to 3,000 mobile radios. In the figure, for example, each mobile radio exchange MX1 to MX6 could alone establish a local network.

A network configuration more extensive than that described above is a system network comprising a single system exchange SX and a plurality (e.g. 2 to 16) of local exchanges MX. The local exchanges MX are connected in a star configuration to the system exchange SX over fixed links 1, such as cables. The system exchange SX acts as a central node between the local exchanges MX. The system network is typically used when the capacity requirements exceed those satisfied by the local network. The system network is assumed to cover a single area where mobile radios roam and where the same services are required within the entire area.

The extended network configuration in turn comprises a roaming information handler RIH and several system networks and local networks connected to it. A typical example is a nationwide radio network. The RIH serves only as a subscriber location information data base. The system exchanges SX are connected to the RIH over data links 2 and calls between the system exchanges are connected over other links 3.

The registrations of the mobile radios MS enable the radio system to keep a record of the location of the mobile radio subscribers so that the calls to the mobile radio subscriber can be connected without the calling party having to know where the subscriber is located.

The subscriber location information is divided between the RIH, SX and MX. The location information stored in the RIH indicates in which system exchange (SX) the subscriber is located. The location information stored in the system exchange SX indicates in which local exchange MX the subscriber is located. Finally, the location information stored in the MX indicates in which registration area the subscriber is located. When the subscriber changes the registration area within the local exchange, only the registration area information in the local exchange MX is updated. But when the subscriber roams to a registration area controlled by another local exchange MX, the location information of the system exchange SX is also updated and the previous local exchange MX is informed that the subscriber is no longer located within its area, as a result of which the MX removes the subscriber from its location register.

The subscriber data are stored in a central database of the SX. When the mobile radio subscriber registers to the local exchange MX, the subscriber data are transferred from the database of the system exchange SX to the database of the local exchange MX. When the mobile radio removes the registration or roams to the area of another local exchange MX, the subscriber data are removed from the database of the previous local exchange MX.

The mobile radio MS registers to a new registration area by selecting a base station according to a predetermined selection procedure, and sends a registration request to the base station. The registration request is then forwarded over a fixed link 4 to the respective mobile radio exchange MX. As the subscriber data are centralized in the database of the system exchange SX, the local exchange MX has to request the system exchange SX for subscriber data when a new mobile radio MS registers. If the SX does not respond in due time or the MX-SX link 1 is inoperative, the MX utilizes the default information or sends a negative registration acknowledgement to the mobile radio MS.

If the SX recognizes the subscriber, it sends the subscriber data to the MX, which stores the data in its database. If the SX does not recognize the subscriber, it may utilize the default information or send a negative registration acknowledgement to the On receiving the subscriber data request from the local exchange MX, the system exchange SX knows that the respective mobile radio (subscriber) is located in this local exchange MX and updates its own location data. The SX may also send a registration removal message to the MX, where the mobile radio MS was previously located, so that the previous MX can remove the subscriber data from its database and route the calls to the current MX.

If the MX-SX link 1 is inoperative when the mobile radio MS registers to the respective MX, the MX continues to request the SX for subscriber data until it receives the data. This ensures that the SX knows in which local exchange MX the subscriber is located almost immediately when the MX-SX link 1 is again operative. On the other hand, if the mobile radio MS has roamed via several local exchanges MX while there was a failure in the data link 1, all these local exchanges MX inform the SX that the subscriber is located in the area of the SX. In such a case, the SX has conventionally checked the time stamps attached by each local exchange MX to the registration at the registration time, and decides on the basis of the time stamps which one of the registrations is the latest one. Then it commands all the other local exchanges to remove the registrations from their respective MX. The registration removal requests are sent from the SX to the local exchanges until the MX acknowledges the removal. In all present exchanges MX and SX and in the RIH, the registration age processing is in a time raster of about 10 seconds, that is, the time in the time stamp is changed at intervals of 10 seconds. In other words, if the mobile radio MS registers to two MXs within the same 10 seconds, both MXs get the same time stamp and the SX considers that they are of equal age so that the registration data that was received last in the SX remains valid. If the link between the MX and the SX is operative, the SX always has the right information of the location of the mobile radio. If there are failures over the links 1, the "newer" registration may be received at the SX before the "older" registration, and so the SX considers them to be of equal age and the "older" location data received later is updated in the location register of the SX.

The same problem occurs between the system exchange SX and the RIH. In other words, if there are failures over the SX-RIH links 2, and the mobile radio registers to the local exchanges MX of two SXs during the same 10 seconds, the RIH is not able to distinguish the newer registration as the registrations entering the RIH have the same time stamp.

The present 10-second age raster could be decreased to e.g. 1 to 2 seconds. This, however, would distort the age due to the data transmission delays of the network, and the same problem would again be encountered. In other words, if the data transmission delay of one MX would be greater than that of the other MX, the "older" registration and location could be received at the SX before the "newer" one, as a result of which the incorrect registration would remain in force.

In the system according to the invention, this problem is avoided in such a way that the mobile radio MS provides its registration messages with information indicating their order of transmission. This information is carried with the registration data in the radio system so that the order of transmission of different registration messages of the same mobile radio can be determined unambiguously in the mobile radio exchange MX, the system exchange SX and the RIH on the basis of the information. The local exchange MX is thus able to determine the correct order of transmission of the registration messages received through the different base stations, which order might otherwise vary due to radio path interferences, line failures or transmission delays. Correspondingly, the system exchange SX is able to determine the order of transmission of the different registration messages of the same mobile radio MS received through the different local exchanges MX on the basis of the order information contained in the registration data. Furthermore, the RIH is able to determine the order of transmission of the different registration messages of the same mobile radio MS received through the different system exchanges SX or local networks on the basis of this information.

In the preferred embodiment of the invention, the information indicating the order of transmission is a serial number, but it may be any appropriate information, such as transmission time. In view of the invention, it is essential that the information is introduced already in the mobile radio MS and that it indicates the order of transmission unambiguously.

The present invention has been described above by way of example with reference to a specific mobile radio configuration. However, the invention can be applied in any radio system where similar problems occur.

The figure and the description related to it are also otherwise only intended to illustrate the present invention. It is details, the radio system according to the invention may vary within the scope of the attached claims.

We claim:

1. A radio system, comprising:
at least one local exchange;
a radio network connected to said local exchange and including a plurality of base stations collectively having a coverage area, and at least one mobile station roaming freely within said coverage area of said base stations;
said mobile station being arranged to inform said radio network of its location by selecting one of said base stations and sending a registration message providing information indicating the order of transmission of the message, to said radio network through the selected base station every time the mobile station moves from one base station to another of said local exchange or a different local exchange;
each said base station being arranged while being the selected base station to forward said message to the connected local exchange;
said radio network being arranged, on the basis of said information, to obtain the order of transmission of the registration messages to accurately determine the location of the mobile station in the case when the mobile station attempts to register to several local exchanges within a short period of time.

2. A radio system, comprising:
at least one local exchange;
a radio network comprising a plurality of fixed radio stations which are spatially separated from one another within a respective radio network area and effectively connected to said local exchange by respective links;
at least one mobile radio station arranged to roam freely within said radio network area and to inform said radio network on each of a plurality of successive occasions of its location by selecting a fixed radio station from among said fixed radio stations in accordance with a predetermined selection procedure and sending to that selected fixed radio station a respective registration message for forwarding by said selected fixed radio station to said local exchange, each said registration message including information indicating the order of transmission thereof by said mobile radio station relative to others of said registration messages for effecting a registration of said mobile radio station in said radio network;
said radio network being arranged to regard as valid only the registration corresponding to the registration message whose included information indicates most recent transmission by said mobile radio station.

3. The radio system of claim 2, wherein:
said local exchange is arranged to determine the order of transmission of different ones of said registration messages received thereby from different ones of said fixed radio stations, based on said information.

4. The radio system of claim 2, wherein:
there are a plurality of said local exchanges, each having a respective said radio network and said mobile radio station is arranged to roam freely within the respective radio network areas of said networks.

5. The radio system of claim 4, further comprising:
at least one system exchange;
each of a plurality of said local exchanges being connected by respective links to said system exchange;
said local exchanges being arranged to inform said system exchange of the respective said registration when said mobile radio station registers to the respective said local exchange for a first time by sending by said mobile radio station of a respective said registration message; and said system exchange being arranged to determine the order of transmission of different ones of said registration messages received thereby from different ones of said local exchanges, based on said information.

6. The radio system of claim 5, wherein:

said at least one system exchange comprises a plurality of said system exchanges; and said radio system further comprises a central database; each said system exchange being effectively connected to said central database;

each said system exchange being arranged to inform said central database of the respective said registration when the mobile radio station registers to the respective said radio network controlled by the respective said system exchange; and said central database being arranged to determine the order of transmission of different ones of said registration messages received thereby from different ones of said system exchanges, based on said information.

7. The radio system of claim 4, wherein:

each said local exchange comprises a respective location database which, based on respective said information as received by the respective said local exchange, stores data as to in which respective area of the respective said radio network said mobile radio station was most recently located.

8. The radio system of claim 5, wherein:

each said system exchange comprises a respective location database which, based on respective said information as received by the respective said system exchange, stores data as to which respective local exchange corresponds to the respective said area of the respective said radio network in which said mobile radio station was most recently located.

9. The radio system of claim 2, wherein:

said information comprises a unique serial number for each said registration message.

10. The radio station of claim 2, wherein:

said information comprises a unique time of transmission for each said registration message.

* * * * *